United States Patent

Schwartz

[11] Patent Number: 6,144,947
[45] Date of Patent: Nov. 7, 2000

[54] SYSTEM FOR AUTOMATICALLY DETERMINING NET CAPITAL DEDUCTIONS FOR SECURITIES HELD, AND PROCESS FOR IMPLEMENTING SAME

[76] Inventor: Peter A. Schwartz, 1011 Park Ave. #5, Hoboken, N.J. 07030

[21] Appl. No.: 09/092,114

[22] Filed: Jun. 5, 1998

[51] Int. Cl.$^7$ .................................................. G06F 17/60
[52] U.S. Cl. ............................. 705/37; 705/35; 705/36
[58] Field of Search ........................... 705/37, 36, 35, 705/30; 235/379

[56] References Cited

U.S. PATENT DOCUMENTS

| | | | |
|---|---|---|---|
| 4,597,046 | 6/1986 | Musmanno et al. | 705/36 |
| 4,677,552 | 6/1987 | Sibley, Jr. | 705/37 |
| 4,815,030 | 3/1989 | Cross et al. | 707/10 |
| 5,045,848 | 9/1991 | Fascenda | 340/825.26 |
| 5,193,056 | 3/1993 | Boes | 705/36 |
| 5,262,942 | 11/1993 | Earle | 705/37 |
| 5,802,499 | 9/1998 | Sampson et al. | 705/35 |
| 5,819,237 | 10/1998 | Garman | 705/36 |
| 5,819,238 | 10/1998 | Fernholz | 705/36 |
| 5,890,140 | 3/1999 | Clark et al. | 705/35 |
| 5,940,809 | 8/1999 | Musmanno et al. | 705/35 |
| 5,946,667 | 8/1999 | Tull, Jr. et al. | 705/36 |

*Primary Examiner*—Emanuel Todd Voeltz
*Assistant Examiner*—John W. Hayes
*Attorney, Agent, or Firm*—Scully, Scott, Murphy & Presser

[57] ABSTRACT

A computer system is provided for automatically calculating broker-dealer disclosure data requirements for a publicly traded security that the broker-dealer holds. The computer system includes a MODEM in electrical/electronic communication with a source of encoded publicly traded security market data and a digital computer comprising a first I/O port for electronic communication with broker-dealer data processing apparatus, a second I/O port for electronic connection to the MODEM for processing the encoded data, and a memory device within which is stored a set of computer instructions defining computer system operation. The digital computer communicates with the broker-dealer apparatus to identify a broker-dealer position in the publicly traded security and processes MODEM-received data relating thereto to calculate a haircut coefficient for adjusting the position to comply with Rule 15-c 3-1 of the Securities Exchange Act, as amended.

9 Claims, 1 Drawing Sheet

SYSTEM FOR AUTOMATICALLY DETERMINING NET CAPITAL DEDUCTIONS FOR SECURITIES HELD, AND PROCESS FOR IMPLEMENTING SAME

BACKGROUND OF THE INVENTION

The present invention relates to calculations of securities positions and, more particularly relates to means for automatically calculating net capital deductions, or "haircuts," for security positions held by a brokerage firm (referred to herein interchangeably with "broker-dealer firm") to ensure government compliance.

The present invention provides means for automatically ensuring compliance with the broker-dealer reporting requirements under Rule 15-c 3-1 of the Security and Exchange Commission, sometimes referred to as the "net capital rule". The net capital rule is a uniform and comprehensive capital adequacy standard for the brokerage industry, including municipal securities dealers (hereinafter referred to interchangeably as "broker-dealer"). The Net Capital Rule was drafted to ensure that broker-dealers maintain sufficient (as qualified by the SEC) aggregate levels of capital and liquid assets for the protection of their customers, investors, creditors and the industry, in the event of a financial crisis, e.g., bankruptcy or insolvency.

Compliance with the net capital rule requires that a broker-dealer valuate its security holdings, that is, adjust a security's marked-to-market value in the broker-dealer's holdings. That is, the paper value of certain securities as representative of the broker-dealer's cash assets is shaved or "haircut", if necessary, in order to properly calculate the broker-dealer's net capital in order that same broker-dealer can show compliance with Rule 15-c 3-1. There are two methods for determining the minimum net capital required to be held by a broker-dealer.

The first method, "the aggregate indebtedness standard" requires the greater of $250,000 ($150,000 for municipal bond dealers) or two percent (2%) of aggregate debit items computed under the customer or client protection rules. The aggregate indebtedness standard requires broker-dealers to maintain a maximum ratio of indebtedness to liquid capital of fifteen (15) to one (1). Indebtedness has been interpreted as including all money owed to the broker-dealer, including margin loans and commitments to purchase securities. Liquid capital is interpreted as including cash and assets easily converted into cash. Broker-dealers that have large aggregate indebtedness are allowed to compute their net capital requirements using the second method, known as the "alternative net capital standard."

"Haircut" is an industry term for a calculated coefficient (a decimal value less than one) which is used to adjust or scale down the security's reportable liquid capital value. The "haircut" value (i.e., liquid capital) may then be utilized to calculate the broker-dealer's net capital requirements and if it in compliance therewith. For that matter, compliance with Rule 15-c 3-1 (the Net Capital Rule) typically requires daily computation of haircut amounts, if any, to the securities held by the broker-dealer to calculate the net market value for each security and therefore, the broker-dealer's position daily. The haircut or calculation for each security held is based on riskiness and liquidity of each category of security held by the broker-dealer. The broker-dealer must always operate in consequence of the calculated net market value of the securities it holds, that is, it must keep a minimum net capital depending on the aggregate value of its securities.

Net capital deductions (that is, haircuts) reduce the broker-dealer's net capital value, a great concern for the SEC. Hence, a device or apparatus capable of automatically calculating a "haircut" for each security held and calculating the adjustment to the broker-dealer's net capital in order to comply with the Net Capital Rule. The automatic calculation may be carried out real time if the apparatus is electronically connected to a source of real-time stock market or securities information.

For that matter, various apparatus and methods are known for encoding stock market data and transmitting same for private or public access. One example is embodied in U.S. Pat. No. 5,045,848 to Fascenda, which discloses a method of encoding and transmitting market data in a cyclical repetitive loop, with real-time data inserted in the loop data during business hours of the New York Stock markets. And U.S. Pat. No. 4,815,030 to Cross et al. discloses a multitask, multi-user system to enable efficient transfer of data from a remote data base (a stock market data base) to individual subscribers for distribution of same stock market data. For that matter most broker-dealers today have stock market data available to them electronically in real-time.

OBJECTS AND SUMMARY OF THE INVENTION

It is therefore an object of the present invention to provide apparatus, and method utilizing same, for assuring broker-dealer compliance with Rule 15c 3-1 of the set of rules promulgated Securities and Exchange Commission (SEC), which overcomes the drawbacks of prior art methods and apparatus.

It is another object of the invention to provide apparatus for automatically calculating a haircut value for a security based on real-time stock market data, and process for carrying out same.

It is another object of this invention provide apparatus which values a dealer's net holdings and generates a minimum net capital requirement for the broker-dealer upon receipt of real-time stock market data.

In a preferred embodiment, the present invention comprises a microcomputer-based SEC-compliance accounting system for automatically calculating a net capital deduction (or haircut) for each security held by a broker-dealer, and various other automatic accounting tasks necessary to comply with SEC rule requirements in general. The system embodies a microcomputer (any general purpose computer such as a personal computer) which is electronically attached at an I/O port a MODEM. The MODEM is connected to the PSTN to maintain electronic data communication with a source of public data on a security traded in a particular market. The MODEM receives telephone signals containing the data and transforms same to a form readable by the microcomputer. The microcomputer is preprogrammed with a set of memory-stored computer instructions which define system operation. Additional I/O ports on the microprocessor allow the system to electronically communicate reports generated by the system as well as accessing broker-dealer relevant account or portfolio information.

Once a haircut total is calculated by the microcomputer for a broker-dealer using the system, an adjusted net capital value is then calculated for the broker-dealer. The microcomputer automatically calculates the broker-dealer's net capital requirements for its aggregate, or entire security holdings (assuming microcomputer access to relevant data broker-dealer financial data) reporting on the broker-dealer's compliance with Rule 15-c 3-1.

The present invention calculates reports automatically in accordance with changes which occur and are received into the system from the source of public data referred to above. For example, if the market makers for an equity security no longer exist, a greater haircut may be required and the net value of the current number of the particular security held by the broker-dealer must be reflect the haircut and comply with Rule 15-c 3-1. The set of computer instructions define a computing method for executing the steps necessary to perform the automatic calculations, and automatically determine, preferably in real time, if the broker-dealers assets render the broker-dealer in or out of compliance with Rule 15-C 3-1.

In one form, a process of this invention may be carried out in real time by which broker-dealers utilizing same may respond to changes in reporting data on one or more publicly traded security held by the broker-dealer. The process includes a number of particular steps, the first of which requires that the broker-dealer electronically communicate with a fixed source of real-time publicly traded security industry data. The step of electronically communicating includes receiving the publicly traded security data in its form as an electronic signal and processes the signal to extract and generate a useable form of the data.

The process also includes accessing a database contains data relating to the broker-dealer's holdings in publicly traded securities, to determine which received security data is relevant to the broker-dealer's compliance with rule 15-C 3-1. Finally, the system calculates a required haircut amount in response to a change in the number of market makers for a security, or other pertinent public information about the security. The step also includes calculating a new net worth amount per share of security held, and determining if the current dealer reporting amounts are still in compliance with the SEC rules in view of the changes in real-time data.

For that matter, it is preferred that the dealer information be maintained and structured in a particular data form (predefined data structure) which complies with ISO standards.

BRIEF DESCRIPTION OF THE DRAWING FIGURES

FIG. 1 is a schematic diagram depicting a first embodiment of a system of this invention.

DETAILED DESCRIPTION OF THE PREFERRED EMBODIMENTS

Figure 1:
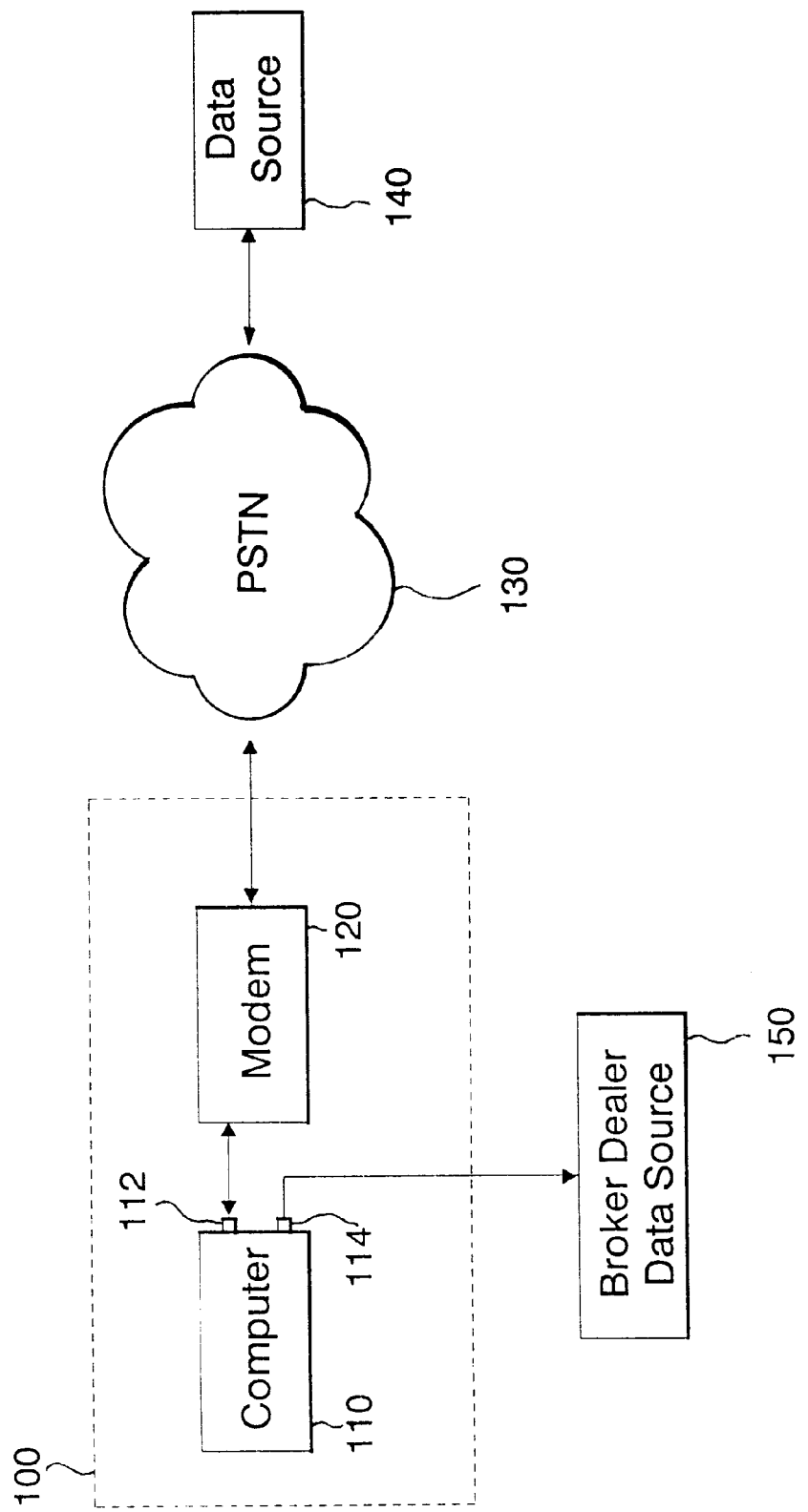

With the US stock markets now considered greatly overvalued, and with trading at an all time high, it is more important than ever to produce accurate financial records. That is, financial records need to be generated without material error. Material error is that error, known in the art, which would/could mislead an investor or creditor, according to generally accepted accounting principles. Though the conventional hand method of calculating a firm's aggregate holding or security position, which is based on a "haircut" calculation required for each security (to be defined in greater detail herein), and of course the individual calculations themselves, monthly, is satisfactory to ensure that the broker-dealer's reporting complies with rule 15-c 3-1. That is, by-hand evaluations have sufficed for all audit compliance purposes. However, the present markets are thick with investor's pensions, and much credit is being granted on inflated stock values. Hence, a more accurate accounting method for assuring broker-dealer compliance with Rule 15-C 3-1 will be welcomed in the industry.

In the case of equity securities listed on a national securities exchange such as the New York Stock Exchange, or the American Stock Exchange or the National Association of Securities Dealers stocks, which have three (3) or more market makers for a security, excluding the computing broker-dealer, each of whom quote a bid or an ask price, the security qualifies for a 15% haircut. If there were only one or two market makers excluding the computing broker dealer, the security would require a 40% haircut. If the security did not meet these minimum market maker, Rule 15-c 3-1 requires that the value of the security relative the dealer's position receive a 100% haircut on the "long" side and 40% haircut on the "short" side. For foreign securities, any Security listed on the Standard and Poors Financial Times World Indices list requires a 15% haircut.

For that matter, to carry out its process, the system of this invention, New York Stock Exchange and the American Stock Exchange listed security data may be electronically secured by the system hardware from any Internet or private fixed data source, e.g., www.nyse.com, www.amex.com, etc. A fixed data source for NASDAQ security data is provided electronically by the National Association of Securities Dealers known as NASDAQ Level II. NASDAQ Level II provides the number of market-makers with bid & ask prices for all securities listed, including "pink sheets" are available through "unilink" service, by ADP, Quotron, Fidelity, Reuters, ILX, Dow Jones/Telerate, MarketMax, to name a few commercial vendors of security related information.

In a preferred form, and as shown in FIG. 1, the system of the present invention comprises a microcomputer-based SEC-compliance accounting system 100 for automatically calculating net capital deductions (or haircuts) to a security value identified and associated with a broker-dealer's portfolio. The haircuts adjust a cash or net value for publicly traded securities held by the broker-dealer in response to real-time changes in market data relating to same securities. The actual haircut amount or deduction from the value of the holding assures that broker-dealers trading in same securities maintain daily compliance with the reporting requirements of Rule 15-C 3-1 of the Securities and Exchange Act of 1933 (SEC).

SEC-compliance accounting system 100 comprises a personal computer ("computer") 110 which is preprogrammed with a set of memory-stored computer instructions which, when executed by the computer, carries out the above stated functions of the system. The computer 110 includes a first input port 112 to which a MODEM 120 is connected. The MODEM 120 provides a communications path through the PSTN 130 by which the computer 110 may maintain electronic communication with a source of publicly traded security data 140 (data source 140).

A second I/O port 114 of computer 110 is shown electronically connected to a source of broker-dealer financial data 150 (broker-dealer data source 150). Broker-dealer data source 150 is a source of data prepared by the broker-dealer required for use by the system 100. Preferably, data source 150 makes available to computer 110 that data defining an aggregate of broker-dealer holdings, or portfolio, i.e., broker-dealer financial data. Broker-dealer data source 150 may include a MODEM or MODEM-like component for communicating the broker-dealer data to the computer 110.

During system operation, MODEM 120 receives telephone signals containing the publicly traded security data PSTN 130. The MODEM transforms the same telephone signals to a data form readable by the computer 110. Upon receipt of the security data, computer 110 accesses its memory to determine whether there have been significant changes in a security, such as a change in a number of market makers for the security. If the system determines that "detected changed" publicly traded security data may affect the broker-dealer in any way, particularly in relation to its Rule 15-C 3-1 reporting requirements associated with the detected changed data, it shall determine whether an adjustment or haircut must be made to the net value asserted by the broker-dealer for each or any security affected as represented by the detected changed security data.

Once a haircut is calculated for a security (for which there was detected changed data) by computer 110 on behalf of a broker-dealer using the system, the system calculates an adjusted net capital value, or marked-to-market value for the exact numbers and class of the security held by the broker-dealer. The system 100 automatically calculates the broker-dealer's net capital requirements for its aggregate, or entire security holdings, and then generates a private report for the broker-dealer indicating any effect by the detected changed data upon the broker-dealer's compliance with Rule 15-c 3-1.

According to Rule 15-c 3-1, the following criteria/data must be utilized to determine the correct net capital requirement (that is, percentage deduction) for various financial products:

a) Equity securities: National Securities Exchange Listing, NASDAQ listing, number of market makers quoting a bid or an asking price;

b) Standard & Poors Financial Times World Indices (for foreign securities);

c) United States Treasury Bills, Notes & Bonds: maturity date;

d) Municipal Bonds: Maturity Date e) Canadian Debt Obligations: Maturity f) Money Market Funds, Mutual Funds: Holdings of Funds g) Commercial Paper, Bankers Acceptances, and Certificates of Deposit: Type of rating by at least two of the Nationally Statistic Organizations, the bank guarantee, and Maturity Date.

h) Non-convertible debt securities: Type of rating by at least two nationally statistic ratings organizations and maturity date.

i) Convertible Debt Securities: Ratio of Market Value to Par Amount, rating by at least two nationally recognized ratings organizations and maturity date.

j) Cumulative, Convertible Preferred Stock: Type of rating by two nationally statistic ratings organizations.

For that matter, Rule 15-c 3-1 states that any short term promissory note of evidence of indebtedness which has a fixed rate of interest or is soft at a discount, and which has a maturity date at date of issuance not exceeding nine months, exclusive of days of grace, or any renewal thereof, the maturity is likewise limited and is rated in one of the three highest categories by at least one of the nationally recognized statistical ratings organizations. In the case of negotiable certificates of deposit or bankers acceptance of similar type as that defined in section 3(a)(6) of the Securities Act of 1934, the applicable percentage of market value of the greater of the long or short position in each of the categories specified below.

| Maturities | Haircut Percentages |
| --- | --- |
| Less than 30 days | 0% |
| 30 days but less than 91 days | ⅛ of 1% |
| 91 days but not less than 181 days | ¼ of 1% |
| 181 days but not less than 271 days | ⅜ of 1% |
| 271 days but not less than 1 year | ½ of 1% |

Rule 15-c 3-1 states that in the case of non-convertible debt securities having a fixed interest rate and a fixed maturity date and which are not traded flat or in default as to principal 0 interest and which are rated in of the four highest rating categories by at least two of the nationally recognized statistical rating organizations, the applicable percentages of the market value of the greater of the long or short position in each of the categories specified below are

| Maturities | Haircut Percentages |
| --- | --- |
| Less than 1 year | 2% |
| 1 year but less than 2 years | 3% |
| 2 years but less than 3 years | 5% |
| 3 years but less than 5 years | 6% |
| 5 years but less than 10 years | 7% |
| 10 years but less than 15 years | 7.5% |
| 15 years but less than 20 years | 8% |
| 20 years but less than 25 years | 8.5% |
| 25 years or more | 9% |

The ratings for all four nationally recognized statistical ratings organizations are available electronically, for example, through the information specialist known in the field as BLOOMBERG™ Information Services (bloomberg.com).

Rule 15-c 3-1 states that in the case of a debt security not in default which has a fixed rate of interest and a fixed maturity date and which is convertible into an equity security, the deductions shall be as follows: If the market value is 100 percent or more of the principal amount the deduction shall be 15% the greater of the long or short positions . . . and if the market value is less than the principal amount, the deduction shall be determined by paragraph (F) of this section (or the same criteria for non-convertible debt securities). Rule 15-c 3-1 further states that "[i]n the case of cumulative, non-convertible preferred stock ranking prior to all other classes of stock of the same issuer, which is rated in one of the four highest categories by at least two of the nationally statistical organizations and which are not in arrears as to dividends, the deduction shall be 10% of the market value of the greater of long or short position.

The schedule below posts haircut percentages based upon maturity date for United States Treasury Securities and for Canadian Government Securities. The information specialist Automatic Data Processing (ADP), an information service provider operating principally in the State of New Jersey, has a security information system known as MSDI which gives maturity dates on such securities, as well as for all bonds, electronically.

| Category | Maturity | Percentage |
| --- | --- | --- |
| Category 1 | Less than 3 months | 0% |
| Category 1 | 3 months but less than | ½ of 1% |

-continued

| Category   | Maturity                            | Percentage |
|------------|-------------------------------------|------------|
|            | 6 months                            |            |
| Category 1 | 6 month but less than 9 months      | ¾ of 1%    |
| Category 1 | 9 months but less than 12 months    | 1%         |
| Category 2 | 1 year but less than 2 years to maturity | 1.5%  |
| Category 2 | 2 years but less than 3 years to maturity | 2%   |
| Category 3 | 3 years but less than 5 years to maturity | 3%   |
| Category 3 | 5 years but less than 10 years to maturity | 4%  |
| Category 4 | 10 years but less than 15 years to maturity | 4.5% |
| Category 4 | 15 years but less than 20 years to maturity | 5% |
| Category 4 | 20 years but less than 25 years to maturity | 5.5% |
| Category 4 | 25 years or more                    | 6%         |

According to Rule 15-c 3-1, "[I]n the case of any municipal security which has a scheduled maturity of 731 days or less and which is issued at par value and pays interest at maturity, or which is issued at a discount, and which is not traded flat or in default as to principal or interest, the applicable percentage on the greater of the long or short position in each of the categories specified below are:

| Maturities                     | Haircut Percentages |
|--------------------------------|---------------------|
| Less than 30 days to maturity  | 0%                  |
| 30 days but less than 91 days  | ⅛ of 1%             |
| 91 days but less than 181 days | ¼ of 1%             |
| 181 days but less than 271 days| ⅜ of 1%             |
| 271 days but less than 366 days| ½ of 1%             |
| 366 days but less than 456 days| ¾ of 1%             |
| 456 days but less than 732 days| 1%                  |

Rule 15-c 3-1 further states that "[I]n the case of any municipal security, other than those specified just above, which is not traded flat or in default as to principal or interest, the applicable percentages of the market value of the greater of the long or short position in each of the categories specified below are:

| Maturities                      | Haircut Percentages |
|---------------------------------|---------------------|
| Less than 1 year                | 1%                  |
| 1 year but less than 2 years    | 2%                  |
| 2 years but less than 3.5 years | 3%                  |
| 3.5 years but less than 5 years | 4%                  |
| 5 years but less than 7 years   | 5%                  |
| 7 years but less than 10 years  | 5.5%                |
| 10 years but less than 15 years | 6%                  |
| 15 years but less than 20 years | 6.5%                |

Rule 15-c 3-1 specifies two groups of percentages based upon whether or not the security has a maturity of 731 days or less and pays a coupon at that maturity. Hence, municipal would be coded A or B depending on the type, and then proper rate would be applied.

In another embodiment, this invention provides a process or method for carrying steps necessary to implement the concepts and principles disclosed herein as embodied by a set of instructions to be executed by a computer or microprocessor such as computer 110 shown in FIG. 1. That is, the process of this invention is implemented by the system microprocessor to automatically calculate a marked-to-market value for a particular publicly traded security at issue, and the value of the same aggregate security holdings of the broker-dealer.

The steps which must be implemented include electronically receiving a fixed source of electronic data which includes encoded stock market data in real-time in a form a an electronic signal. The electronic signal, and the market data inherent therein, are processed by the system microprocessor in a comparison with broker-dealer data accessible to the microprocessor by the system. That is, the real time market data is compared to existing memory-stored broker-dealer data. The stored broker-dealer data is updated by the system each time the process is carried out. That is, a marked-to-market value for the security held by the broker-dealer is calculated and compared to the memory stored marked-to-market value present in the system's accessible memory locations. If the newly calculated marked-to-market value is less than the stored value, the dealer must report same to comply with Rule 15-C 3-1. Of course a printer may be included with the hardware defining the system so that a physical report may be generated.

To ensure that the system of this invention is accurately operational in view of the law, certain checks and balances are preferably included herein. In particular, upon authorized inquest to the system (by an I/O device known in the art), the system data would be accessible to an auditor of a regulatory entity, such as the SEC, the broker-dealer and authorized accounting firms of same. For that matter, the information could be made available via telephone (and MODEM), or LAN/WAN/MAN means of data communication. And while the present invention is constructed to operate in view of Rule 15-c 3-1 to date, the system includes the flexibility to respond and incorporate any changes to the rule to complete its intended tasks described herein.

What is claimed is:

1. A computer system for automatically calculating broker-dealer disclosure data for a publicly traded security that the broker-dealer holds to comply with current SEC rules for regulating said broker-dealer data, comprising:
   a MODEM in electrical/electronic communication with a source of encoded publicly traded security market data; and
   a digital computer comprising a first I/O port for electronic communication with broker-dealer data processing apparatus, a second I/O port for electronic connection to the MODEM for processing the encoded data, and a memory device within which is stored a set of computer instructions defining computer system operation;
   wherein the digital computer communicates with the broker-dealer apparatus to identify a broker-dealer position in the publicly traded security and processes MODEM-received data relating thereto to calculate a haircut coefficient for adjusting the position, adjusting the position based on the haircut and communicating data reflecting the adjusted position.

2. The computer system of claim 1, wherein said digital computer provides for memory storage of a set of encoded publicly traded security market data to which newly received MODEM data are compared for data changes.

3. A real-time method for automatically calculating a disclosure value for a position in a security held by an SEC-regulated broker-dealer through the use of a digital computer which is in communication with (1) a source of real-time encoded securities industry data and (2) a source of relevant broker-dealer data, the computer including ROM encoded with a set of executable instructions, the method comprising the steps of:

electronically receiving and processing said real-time data;

electronically identifying changes in said real-time data by comparing same to a stored set of the data;

electronically processing broker-dealer real-time data to generate a haircut coefficient for adjusting the position in said security;

adjusting said position based on said haircut coefficient calculated to comply with current SEC rules for regulating said broker-dealer data and communicating data representing said adjusted position.

4. The method defined by claim 3, further comprising a step calculating a marked-to-market value of said security.

5. A digital computer constructed to automatically calculate a haircut coefficient for adjusting a disclosure value for a publicly traded security to comply with current SEC rules for regulating said broker-dealer data; the computer comprising:

a first I/O port in electronic communication with a computer memory device within which is stored digital data defining a broker's position in said publicly traded security;

a MODEM in electronic communication with a source of real-time stock market data;

a microprocessor in communication with the MODEM and first I/O port;

a read-only memory device electronically connected to the microprocessor within which is stored a set of computer instructions which calculates said haircut based on said current SEC rules and adjusts said disclosure value based thereon; and a second I/O port for communicating said disclosure data.

6. The digital computer defined by claim 5, wherein said microprocessor calculates a percentage reduction of the security's value.

7. The digital computer defined by claim 6, wherein said microprocessor calculates a net market value for said security.

8. The digital computer defined by claim 7, wherein said microprocessor calculates an aggregate valuation of a broker-dealer's position in said security.

9. The digital computer defined by claim 7, wherein said microprocessor recognizes a minimum amount of cash and/or liquid assets of which the securities dealer-broker must possess to comply with the net capital rule and compares the minimum amount to the net market value based on said haircut.

* * * * *

UNITED STATES PATENT AND TRADEMARK OFFICE
CERTIFICATE OF CORRECTION

PATENT NO. : 6,144,947  Page 1 of 1
DATED : November 7, 2000
INVENTOR(S) : P. Schwartz It is certified that error appears in the above-identified patent and that said Letters Patent is hereby corrected as shown below:

<u>Column 9,</u>
Line 22, "said broker-dealer" should read -- broker-dealer --

<u>Column 10,</u>
Line 23, "the net capital rule" should read -- current SEC rules --

Signed and Sealed this

Thirtieth Day of July, 2002

Attest:

Attesting Officer

JAMES E. ROGAN
*Director of the United States Patent and Trademark Office*